United States Patent
Floessholzer

(10) Patent No.: US 12,329,314 B2
(45) Date of Patent: Jun. 17, 2025

(54) AIR-FRYING COOKER

(71) Applicant: KONINKLIJKE PHILIPS N.V., Eindhoven (NL)

(72) Inventor: Hannes Uwe Floessholzer, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 432 days.

(21) Appl. No.: 16/307,257

(22) PCT Filed: Jun. 7, 2017

(86) PCT No.: PCT/EP2017/063761
§ 371 (c)(1),
(2) Date: Dec. 5, 2018

(87) PCT Pub. No.: WO2017/215988
PCT Pub. Date: Dec. 21, 2017

(65) Prior Publication Data
US 2019/0298105 A1 Oct. 3, 2019

(30) Foreign Application Priority Data

Jun. 15, 2016 (CN) .......................... 201610424252.6
Jun. 15, 2016 (CN) .......................... 201620583147.2
(Continued)

(51) Int. Cl.
*A47J 37/06* (2006.01)
*A23L 5/10* (2016.01)

(52) U.S. Cl.
CPC ............. *A47J 37/0641* (2013.01); *A23L 5/17* (2016.08); *A47J 37/0664* (2013.01)

(58) Field of Classification Search
CPC .. A47J 37/0641; A47J 37/0664; A47J 37/041; A47J 36/38; A47J 36/20;
(Continued)

(56) References Cited

U.S. PATENT DOCUMENTS 2,227,608 A * 1/1941 Tinnerman ............... A47J 37/06
126/41 E
2,259,073 A * 10/1941 McGlaughlin ........ A47J 37/044
99/441

(Continued)

FOREIGN PATENT DOCUMENTS

CN 2494642 Y 6/2002
CN 101500462 A 8/2009
(Continued)

OTHER PUBLICATIONS http://www.p4c.philips.com/cgi-bin/cpindex.pl?scy=NL&ctn=HD9980%2F25&slg=AEN.

*Primary Examiner* — Sang Y Paik
*Assistant Examiner* — Bonita Khlok
(74) *Attorney, Agent, or Firm* — Schott, P.C.

(57) ABSTRACT

Embodiments of the present invention discloses an air-frying cooker (100), comprising: a vessel (101); a heating means located above the vessel (101); a food support (102) located in the vessel (101) and having an air-permeable bottom (1021), the partition (104) dividing a space in the vessel into a first chamber (1011) accommodating the food support (102) and a second chamber (1012) located below the first chamber (1011); and a guide member (105) located on a bottom wall (1013) of the vessel (101). The partition (104) at least partially blocks heat transfer from the first chamber (1011) to the second chamber (1012), and guides materials falling from the air-permeable bottom (1021) of the food support (102) into the first chamber (1011) to the (Continued)

second chamber (1012). The air-frying cooker (100) reduces generation of fume during cooking.

18 Claims, 6 Drawing Sheets

(30) Foreign Application Priority Data

Jun. 15, 2016 (EP) ..................................... 16174515
Apr. 26, 2017 (EP) ..................................... 17168212

(58) Field of Classification Search
CPC ........ A47J 36/34; A47J 27/00; A47J 2202/00;
A47J 36/32; A47J 27/04; A47J 27/16;
A47J 27/62; A47J 37/0704; A47J
37/0786; A23L 5/17; F24C 15/322; F24C
15/325; F24C 15/327
USPC ..... 99/330, 400, 408, 444, 341, 421 H, 446,
99/447, 326, 328, 331, 343, 348, 407,
99/409, 427, 419, 451, 468, 473, 482,
99/490, 494
See application file for complete search history.

(56) References Cited

U.S. PATENT DOCUMENTS

| | | | |
|---|---|---|---|
| 3,154,005 A * | 10/1964 | Roecks ..................... | F24C 7/06 |
| | | | 219/405 |
| 4,068,572 A * | 1/1978 | Vogt ....................... | A47J 37/047 |
| | | | 219/400 |
| 4,561,348 A * | 12/1985 | Halters ................... | A47J 37/041 |
| | | | 219/400 |
| 4,683,867 A * | 8/1987 | Beatty ................... | A47J 37/0713 |
| | | | 126/41 R |
| 4,865,864 A | 9/1989 | Rijswijck | |
| 5,451,744 A * | 9/1995 | Koopman ............. | A47J 37/042 |
| | | | 219/400 |
| 5,517,980 A | 5/1996 | Cappello et al. | |
| 7,002,110 B2 | 2/2006 | Satou | |
| 2009/0134140 A1 * | 5/2009 | Van Der Weij ....... | F24C 15/322 |
| | | | 219/400 |
| 2009/0255414 A1 * | 10/2009 | Wang ................... | A47J 37/0713 |
| | | | 99/446 |
| 2009/0301463 A1 * | 12/2009 | Park ........................ | A47J 36/06 |
| | | | 126/25 R |
| 2012/0125313 A1 * | 5/2012 | Van Der Weij ....... | F24C 15/322 |
| | | | 126/21 R |
| 2013/0180413 A1 * | 7/2013 | Tjerkgaast .............. | A47J 37/06 |
| | | | 99/447 |
| 2016/0102870 A1 * | 4/2016 | Timmins ................. | F24C 15/14 |
| | | | 426/496 |
| 2017/0245686 A1 * | 8/2017 | Man ...................... | A47J 37/1257 |
| 2018/0289212 A1 * | 10/2018 | Sladecek ............. | A47J 37/0641 |

FOREIGN PATENT DOCUMENTS

| | | |
|---|---|---|
| CN | 102203511 A | 9/2011 |
| CN | 103690065 A | 4/2014 |
| CN | 103767562 A | 5/2014 |
| CN | 203776719 U | 8/2014 |
| CN | 104207657 A | 12/2014 |
| CN | 104770418 A | 7/2015 |
| CN | 204811685 | 12/2015 |
| CN | 105307547 A | 2/2016 |
| DE | 19545993 A1 | 6/1997 |
| GB | 2525943 A | 11/2015 |
| JP | H09-201292 A | 8/1997 |
| WO | 9915058 A1 | 4/1999 |
| WO | 2015028911 A1 | 3/2015 |
| WO | 2015044115 A1 | 4/2015 |
| WO | 2016058920 A1 | 4/2016 |

* cited by examiner

AIR-FRYING COOKER

This application is the U.S. National Phase application under 35 U.S.C. § 371 of International Application No. PCT/EP2017/063761, filed on Jun. 7, 2017, which claims the benefit of International Application No. 16174515.3 filed on Jun. 15, 2016 and International Application No. 201610424252.6 filed Jun. 15, 2016 and International Application No. 201620583147.2 filed Jun. 15, 2016 and International Application No. 17168212.3 filed Apr. 26, 2017. These applications are hereby incorporated by reference herein.

FIELD OF THE INVENTION

Embodiments of the present invention relate to a food-preparing apparatus, and particularly to an air-frying cooker.

BACKGROUND OF THE INVENTION

An air-frying cooker is an appliance which can cook, e.g., oil-fry food with hot air. The air-frying cooker enables hot airflow to pass over the food to increase heat transfer to the food and thereby reduce the cooking duration. The air-frying cooker is popular in the market because it uses much less oil to prepare the food as compared with conventional oil frying. However, conventional air-frying cookers still generate fume during use, particularly when cooking fatty food at a temperature above 140 centigrade degrees.

Cooking fume is one of main drawbacks of the air-frying cooker, which contains fine particles and pollutes air, and therefore causes disgusting fume smell in a long period of time. In addition, the cooking fume generated by the air-frying cooker might trigger a smog detector and an air purifier to send an alarm. Generation of fume has become a main reason for non-technical return of air-frying cooker products and negative evaluations on air-frying cooker products.

Therefore, an improved air-frying cooker is needed to effectively cope with the cooking fume.

SUMMARY OF THE INVENTION

When a current air-frying cooker is used to cook meat-like food (e.g., chicken, steak, ham, ribs, fish and the like), heat extracts water and grease from meat. The extracted water and grease fall onto a tray. The tray at a high temperature heats the fallen grease to above its smoke point temperature (e.g., 200 centigrade degrees) so that fume is generated. When water extracted from the food falls into the oil in the tray, it is heated and evaporated quickly. Evaporation of water in hot oil higher than 160 centigrade degrees causes explosion of super-hot vapor. Exploded vapor carries a lot of small oil droplets. These small oil droplets are directly splashed onto a heating pipe (its temperature is about 400 centigrade degrees) or delivered into the whole circulating airflow so that these small oil droplets are immediately charred and generate a lot of fume and smoke.

The present invention reduces and even eliminates generation of fume during use of the air-frying cooker by separating the grease, fragments and water from the cooked food and delivering them to a low-temperature area away from the hot airflow circulation.

According to an embodiment of the present invention, there is provided an air-frying cooker, comprising: a vessel; a heating means located above the vessel; a food support located in the vessel and having an air-permeable bottom; and an airflow generating device configured to enable air heated by the heating means to form an airflow to heat food accommodated in the food support; a partition located in the vessel and located below the food support, the partition divides a space in the vessel into a first chamber accommodating the food support and a second chamber located below the first chamber; wherein the partition at least partially blocks heat transfer from the first chamber to the second chamber, and guides materials falling from the air-permeable bottom of the food support into the first chamber to the second chamber.

In some embodiments, a guide member may be provided designed to guide the materials that fall from the air-permeable bottom of the food support into the first chamber to the second chamber. For instance, in some embodiments, the guide member may guide the materials entering the second chamber from the first chamber towards a direction away from a radial center of the vessel. Advantageously, the guide member is designed to guide the materials that enter the second chamber to a location sheltered from the air flow, that is, out of the flow path of the air flow, for instance to a location underneath the partition, with "underneath" meaning within the boundaries of the vertical projection of the partition.

In some embodiments, the guide member may be located below the food support.

In some embodiments, the guide member may be located at least partly in the second chamber.

In some embodiments, the guide member may extend at least partly into the first chamber.

In some embodiments, the guide member may be located on a bottom wall of the vessel.

In some embodiments, the guide member may be connected to the partition.

In some embodiments, the partition comprises a guide surface having an opening at or near the center, the guide surface, from its edge to the opening, gradually inclines towards the bottom of the vessel to guide the materials falling into the first chamber to move along the guide surface and enter the second chamber through the opening.

In some embodiments, the opening may be located at or near the center of the guide surface.

In some embodiments, the guide surface may comprise several openings.

In some embodiments, the guide member is aligned, in an axial direction of the vessel, with the opening in the guide surface of the partition, and the guide member has a directing surface gradually extending inclined away from the opening or from a level nearby the opening to the bottom wall of the vessel.

In some embodiments, a gap is provided between the guide member and the opening to allow the materials falling into the first chamber to enter the second chamber through the gap.

In some embodiments, the guide member is, on the whole, substantially conical, pyramid, spirally-conical, frustoconical, truncated pyramid, or truncated spirally-conical.

In some embodiments, the food support has an air-impermeable side wall, a first space is provided between the side wall and an outer wall of the vessel, a second space is provided between the air-permeable bottom of the food support and the guide surface of the partition, and the first space and the second space form a portion of an air circulation passageway which is in the first chamber and passes through the food support.

In some embodiments, the guide member passes through the opening and partially extends into the first chamber. A portion of the directing surface located in the first chamber guides air from the second space to pass through the air-permeable bottom of the food support into the food support.

In some embodiments, the shape of the opening in the partition may be complementair to that of the guide member so that the opening can be fitted around the guide member, with the guide member at least partly projecting beyond the guide surface of the partition.

In some embodiments an air guide arrangement may be provided, designed to guide air towards and through the air-permeable bottom of the food support into the food support.

In some embodiments, the air guide arrangement may be located below the food support.

In some embodiments, the air guide arrangement may be located at least partly into the first chamber.

In some embodiments, the air guide arrangement may be located at least partly in the second chamber.

In some embodiments, the air guide arrangement may be located on a bottom wall of the vessel.

In some embodiments, the air guide arrangement may be located on the partition.

In some embodiments, the air guide arrangement may be connected to or integrally formed with the partition.

In some embodiments the guide member may comprise the air guide arrangement. That is, in some embodiments, the guide member, or at least a portion thereof, may serve as air guide arrangement to guide air to pass through the air-permeable bottom of the food support into the food support. In other embodiments, the guide member and air guide arrangement may be separate structures. In some embodiments, the air-frying cooker may only comprise an air guide arrangement, no guide member.

In some embodiments, the air guide arrangement may be of similar geometry as the guide member, for instance, substantially conical, pyramid, spirally-conical, frustoconical, truncated pyramid, or truncated spirally-conical.

In some embodiments, the air guide arrangement may comprise at least one air guide rib. The at least one rib may extend from the opening in the partition. The at least one rib may extend in an essentially radial direction. The at least one rib may be straight or curved.

In some embodiments, the food support has a handle extending to the external of the vessel, and the food support is supported in the vessel via the handle.

In some embodiments, the partition further comprises a supporting wall, and the partition is supported on a bottom wall of the vessel via the supporting wall. In some embodiments, the food support is a grille plate or a basket.

In some embodiments, the food support is directly placed on the partition, for instance on the guide surface of the partition.

In some embodiments, the partition may be attached to the food support, preferably in a detachable way.

In some embodiments, the partition has a handle extending to the external of the vessel, and the partition is supported in the vessel via the handle.

In some embodiments, the partition has a supporting structure, such as a wall or legs, with which the partition can stand on a bottom wall of the vessel.

In some embodiments, an inclination angle of the guide surface relative to the bottom wall of the vessel is equal to or larger than 10 degrees.

In some embodiments, during operation of the air-frying cooker, the partition makes a temperature in the second chamber lower than that in the first chamber by about 50 centigrade degrees.

In the air-frying cooker according to embodiments of the present invention, the partition is provided to divide the space in the vessel into the first chamber and the second chamber, materials generated during the cooking are delivered via the partition to the second chamber at a relatively lower temperature, thereby it reduces even eliminates generation of the fume during use of the air-frying cooker to cook food.

The invention furthermore relates to a partition for use in an air-frying cooker, to divide an internal space in said air-frying cooker into a first chamber for accommodating food and a second chamber located below the first chamber, and to at least partially block heat transfer from the first chamber to the second chamber, wherein the partition comprises an inclined guide surface for guiding materials that in use may fall onto said guide surface towards and through an opening in said guide surface. The guide surface may be provided with an air guide arrangement, designed to deflect air that flows along said guide surface upwards. The partition may be made, at least partly, from a plastic material.

BRIEF DESCRIPTION OF THE DRAWINGS

The above and other objects and properties of the present invention will be made more apparent in combination with the following detailed description with reference to the following figures.

Throughout the above figures, the same reference numerals are understood as referring to identical, like or corresponding features or functions.

DETAILED DESCRIPTION OF THE EMBODIMENTS

Now reference is made to embodiments of the present invention now, and one or more examples of the embodiments are shown in the figures. Embodiments are provided by illustrating the present invention and are not intended to limit the present invention. For example, features shown or described as a portion of an embodiment may be used in another embodiment to generate a further embodiment. The present invention intends to include these and other modifications and variations falling within the scope and spirit of the present invention.

Figure 1:
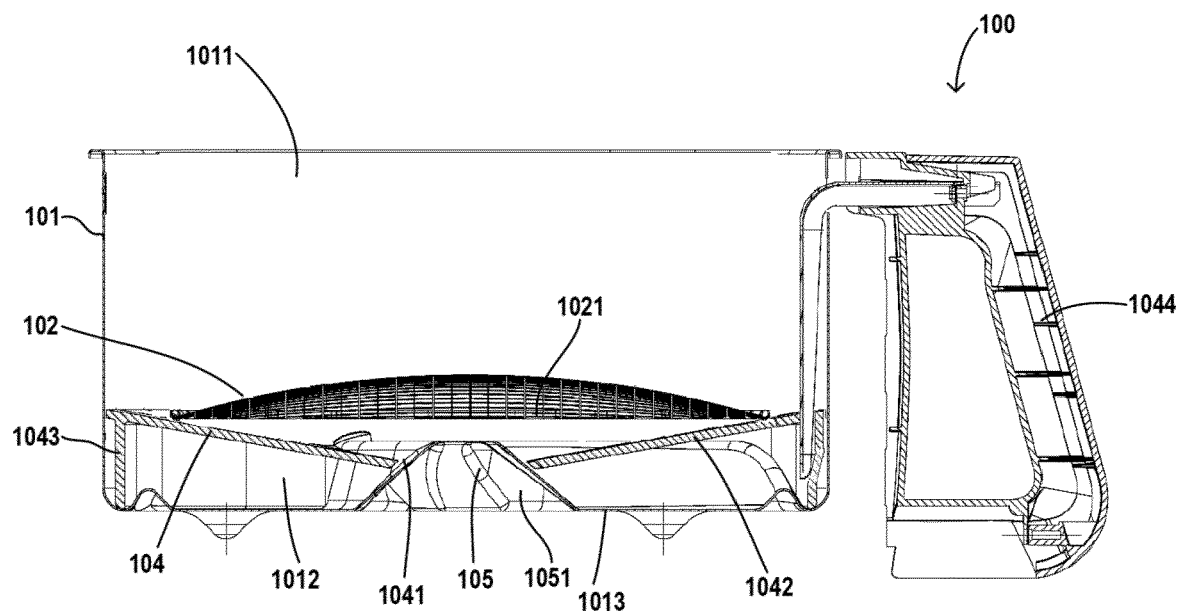
FIG. 1 is a sectional view of an air-frying cooker according to a first embodiment of the present invention.
Figure 3:
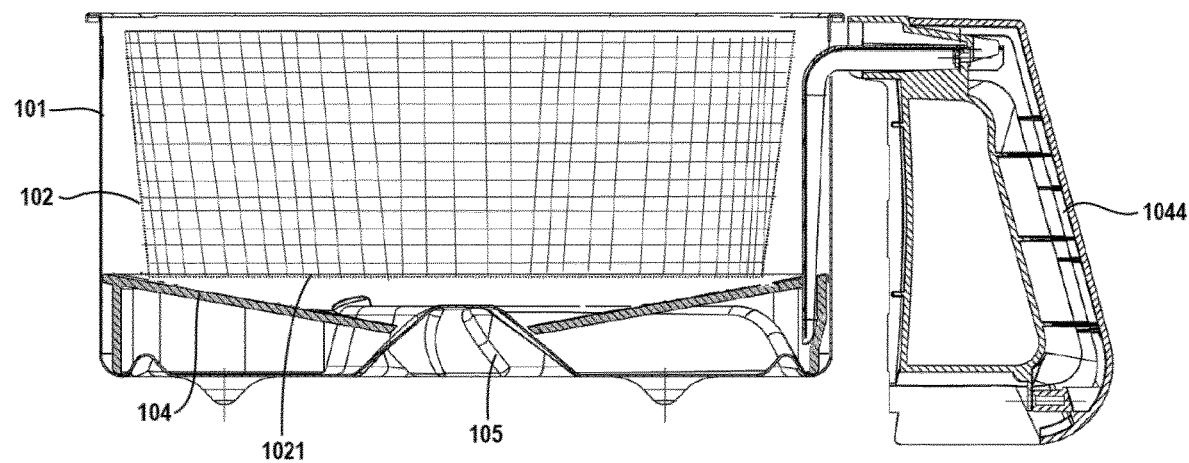
FIG. 3 is a sectional view of the air-frying cooker of FIG. 1 having an alternative food support.

FIG. 1 shows an air-frying cooker 100 according to a first embodiment of the present invention. The air-frying cooker 100 comprises: a vessel 101; a heating means (not shown; usually located in a lid covering the vessel 101) located above the vessel 101; a food support 102 located in the vessel 101; and an airflow generating device (not shown) such as a fan. The airflow generating device is usually disposed above the vessel to enable air heated by the heating means to form airflow. The generated airflow may flow over a surface of food received by the food support 102 to heat the food. The food support 102 usually has an air-permeable bottom 1021 to facilitate the airflow reaching the bottom of the food supported on the food support 102 to heat the food on the whole surface of the food. In the embodiment shown in FIG. 1, the food support 102 is a grille plate, and the food may be directly placed on the grille plate for cooking. The food support 102 may also be a basket having an air-permeable bottom and air-permeable sidewalls (see FIG. 3), or a pot having an air-permeable bottom and air-impermeable sidewalls (see FIG. 4).

Figure 6:
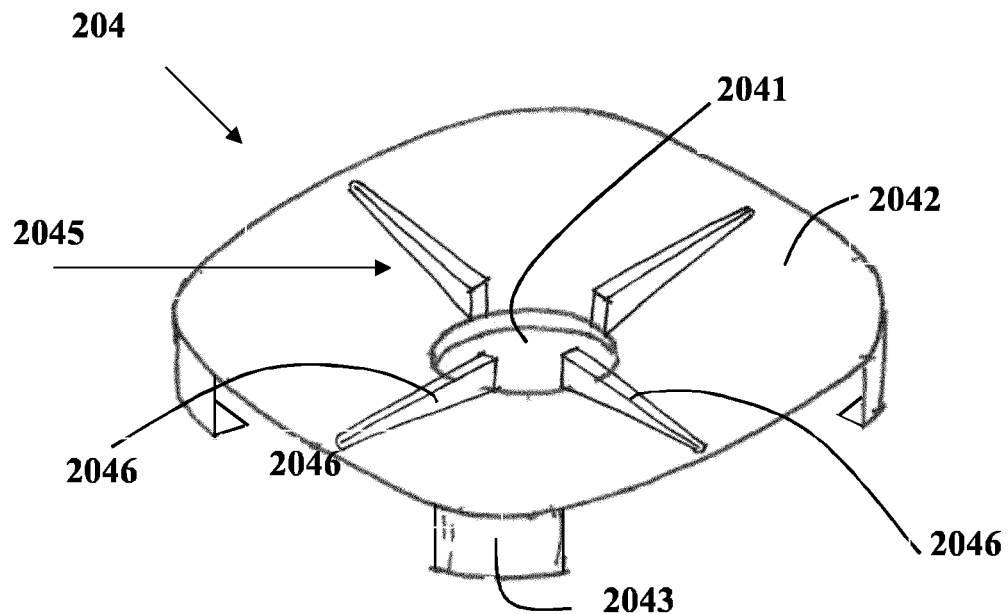
FIGS. 6 to 11 show further embodiments of a partition according to the invention.
Figure 7:
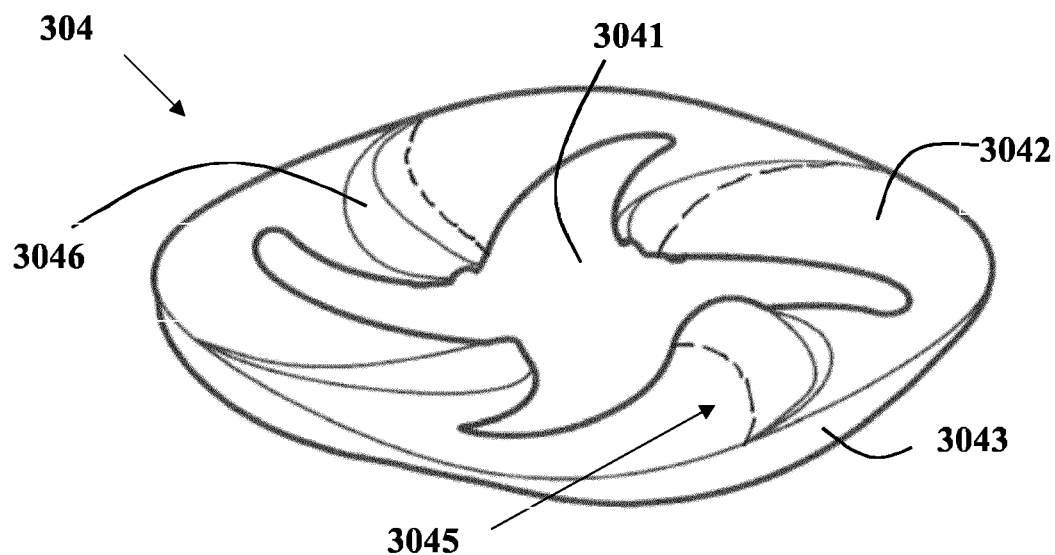

The air-frying cooker 100 further comprises a partition 104 located in the vessel 101 and located below the food support 102. The partition 104 divides a space in the vessel into a first chamber 1011 accommodating the food support 102 and a second chamber 1012 located below the first chamber 1011. The partition 104 comprises a guide surface 1042 having an opening 1041. In the illustrated embodiments, the opening 1041 is located at the center of the partition 104. In other embodiments, the opening may be located away from the center. Also, more than one opening may be provided. The guide surface 1042, from its periphery to the opening 1041, gradually inclines towards the bottom of the vessel 101 so as to guide materials such as grease, food fragments and water falling into the first chamber 1011 to move, due to action of gravity, towards the opening 1041 along the guide surface 1042 and enter the second chamber 1012 through the opening 1041. The guide surface 1042 may be a flat tapered surface as shown in FIG. 1 or a surface in other shapes such as a convexly or concavely curved surface or a helical surface. Alternatively, the guide surface 1042 may be provided with a profile, as illustrated in FIGS. 6 and 7. An inclination angle of the guide surface 1042 relative to a bottom wall 1013 of the vessel 101 may be arbitrarily arranged so long as the guide surface 1042, from its periphery to the opening 1041, generally inclines towards the bottom of the vessel 101.

Advantageously, the inclination angle of the guide surface 1042 relative to the bottom wall 1013 of the vessel 101 may be above 10 degrees so as to better guide materials falling onto the guide surfaces 1042 to nearby the opening 1041 by means of gravity and airflow and to fall into the second chamber 1012 through the opening 1041.

Figure 2:
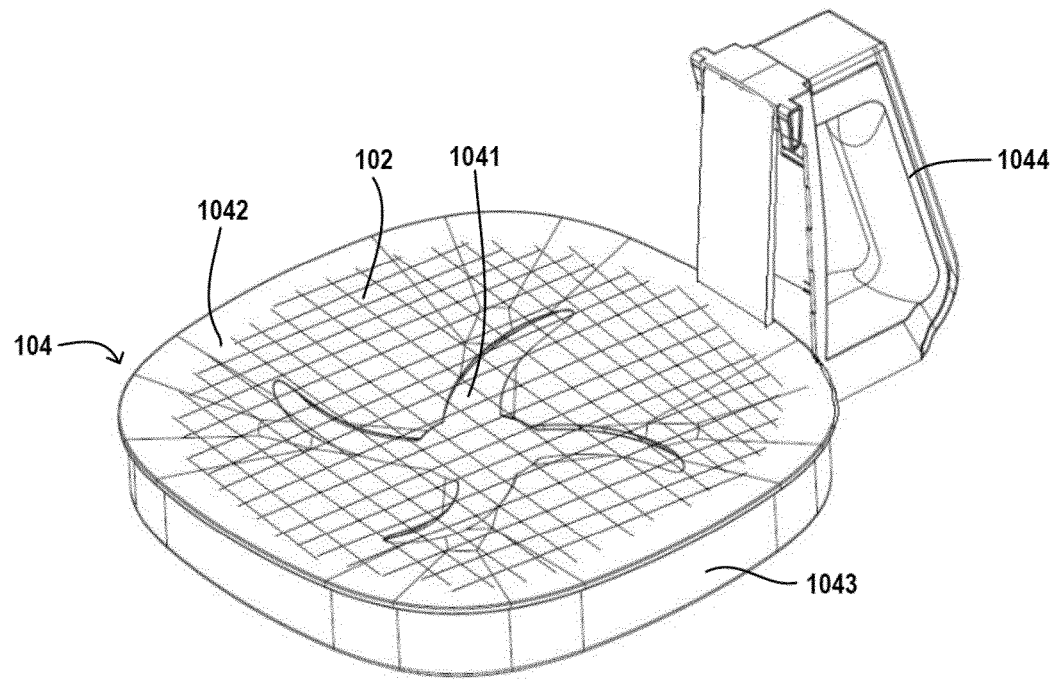
FIG. 2 shows a partition in the air-frying cooker of FIG. 1.

In the embodiment as shown in FIG. 1, the partition 104 has a handle 1044 extending to the external of the vessel 101, as also shown in FIG. 2. A bent portion of the handle 1044 may be rested in a notch on a sidewall of the vessel 101 to support the partition 104 in the vessel 101. In this case, the food support 102 may be directly placed and positioned on the partition 104, e.g. on the guide surface 1042 or an edge of the partition 104. While the handle 1044 extending to the external of the vessel provides the positioning and supporting to the partition 104, it also facilitates placing and removing the partition 104 and the food support 102 placed thereon from the exterior of the vessel 101 by the user.

Alternatively, the partition 104 may be attached to the food support 102, and the food support 102 may be supported in the vessel 101, for instance by means of a similar handle 1044.

Figure 8:
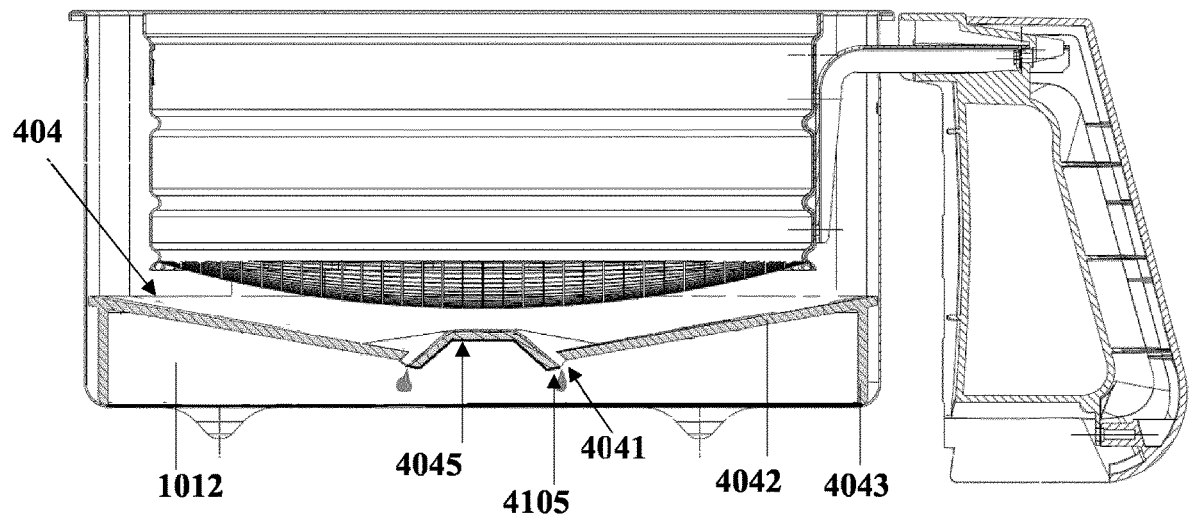

Optionally, a lower portion of the partition 104 may be provided with a supporting structure, such as a circumferential wall 1043 as shown in FIGS. 1 to 5, legs 2043 as shown in FIG. 6, or a cuplike structure 4043 as shown in FIG. 8. The supporting wall 1043, legs 2043 or cup 4043 may vertically extend to nearby or onto the bottom wall 1013 of the vessel 101 to further isolate the second chamber 1012 from the first chamber 1011 at a peripheral location between the partition 104 and the sidewall of the vessel 101.

In the embodiment as shown in FIG. 2, the opening 1041 is a starfish-shaped opening having several legs extending outwardly from the center. However, it should be appreciated that the opening 1041 may be in any shape including a simple circular opening as illustrated in FIG. 6 or a polygonal opening, or a plurality of openings, so long as it allows materials to pass therethrough.

When the air-frying cooker 100 is used to cook food, the air heated by the heating means is driven by the airflow generating device to generate a hot airflow. The hot airflow flows over the food accommodated on the food support 102 and heats it. Materials such as the grease and water extracted from the heated food and food fragments falling off the food fall through the air-permeable bottom 1021 of the food support 102 onto the guide surface 1042 of the partition 104 below the food support 102. Since the guide surface 1042 inclines towards the bottom wall 1013 of the vessel 101 in a direction towards the opening 1041, these materials falling onto locations of the guide surface 1042, due to the action of gravity combined with airflow, move along the guide surface 1042 to nearby the opening 104 and fall through the opening 1041 into the second chamber 1012 below the partition 104.

Since the guide surface 1042 of the partition 104 separates the first chamber 1011 from the second chamber 1012 at a large extent, heat irradiation generated by the heating means located above the vessel 101 and directly communicated with the first chamber 1011 is at least partially blocked by the partition 104; meanwhile, the hot airflow heated by the heating means is also partially blocked by the partition 104 and seldom enters the second chamber 1012. Hence, convection and heat conduction for the second chamber 1012 via air is also reduced. In this way, due to the blocking of the partition 104, heat transfer from the first chamber 1011 to the second chamber 1012 is weakened so that a temperature of the second chamber 1012 is prominently lower than that of the first chamber 1011, and the temperature of the second chamber 1012 reaches a level lower than a smoke point temperature of the cooked food. As such, grease, water and fragments from the food generated during the cooking are all guided in time via the guide surface 1042 away from the first chamber 1011 of high-temperature and into the second chamber 1012 with the temperature lower than its smoke point temperature. In the second chamber 1012, these materials do not continue to be heated by participating in hot air circulation and cannot come in contact with the high-temperature heating means, so they will not be heated to above the smoke point temperature and will not generate fume. Meanwhile, the temperature of the bottom wall 1013 of the vessel located in the second chamber 1012 is also lower than the smoke point temperature, and even though these materials finally fall on the bottom wall 1013 of the vessel, they are not heated by the bottom wall 1013 of the vessel to the smoke point temperature and do no generate fume. Hence, an effect of reducing or even eliminating fume is achieved. Optionally, the bottom wall and/or side walls of the second chamber 1012 may be actively cooled, e.g. by cooling their outer side. This may further help to reduce the temperature in the second chamber.

A size of the opening 1041 of the guide surface 1042 should not be excessively large to avoid excessively weakening the effect of the partition 104 of blocking heat transfer. With the size of the opening 1041 being set properly, use of the partition 104 may enable the temperature in the second chamber 1012 to be lower than that in the first chamber 1011 by about 50 centigrade degrees during operation of the air-frying cooker 100, to achieve the function of effectively avoiding fume.

As shown in FIG. 1, advantageously, the vessel 101 may further be provided with a guide member 105. The guide member 105 may for instance be provided on a bottom wall 1013 of the vessel 101. In the illustrated embodiment, a sectional area of the guide member 105 gradually increases from its top portion to its bottom portion, and is, on the whole, substantially conical, pyramid, spirally-conical, frustoconical, truncated pyramid, or truncated spirally-conical. The guide member 105 is aligned, in an axial direction of the vessel 101, with the opening 1041 in the guide surface 1042 of the partition 104, and the guide member 105 has a directing surface 1051 gradually extending inclined away from a radial center of the vessel 101 in a vertical direction from nearby a level of the opening 1041 to the bottom wall 1013 of the vessel 101. Advantageously, the top portion of the guide member 105 may extend through the opening 1041 into the first chamber 1011. A suitable gap is provided between the guide member 105 and the opening 1041 to allow the materials falling into the first chamber 1011 to enter the second chamber 1012 through the gap.

The guide member 105, on the one hand, may cover most area of the center of the opening 1041 and only leaves a clearance at the periphery of the opening 1041 to allow materials such as grease to pass therethrough, thereby further separating the first chamber 1011 from the second chamber 1012 to achieve an advantageous effect of better blocking heat transfer from the first chamber 1011 to the second chamber 1012 to enable a lower temperature of the second chamber 1012.

Meanwhile, the directing surface 1051 on the guide member 105 extending downwardly inclined from the opening 1041 to the periphery further guides materials coming from the first chamber 1011 and falling thereon through the opening 1041 to move along the directing surface 1051 in a direction away from said opening. This enables the materials falling into the second chamber 1012 to be stored further away from the opening 1041, and this enables these materials falling into the second chamber 1012 further away from influence of local high temperature at an area nearby the opening 1041 due to local exposure to the first chamber 1011, so that these materials can maintain a lower temperature in the second chamber 1012.

In addition, the substantial cover to the opening 1041 by the guide member 105 and the guidance of the materials away from the opening 1041 by the guide member 105 also prevent the hot airflow in the first chamber 1011 from substantially entering the second chamber 1012 through the opening 1041 and blow materials that have already fallen into the second chamber 1012 back to the first chamber 1011 again.

Figure 4:
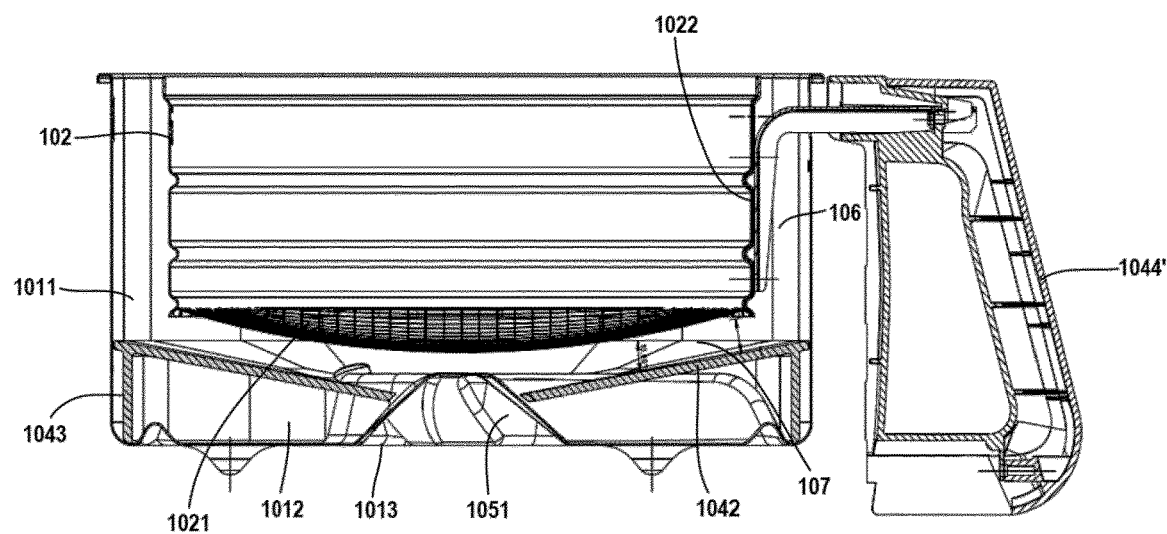
FIG. 4 is a sectional view of an air-frying cooker according to a second embodiment of the present invention.
Figure 5:
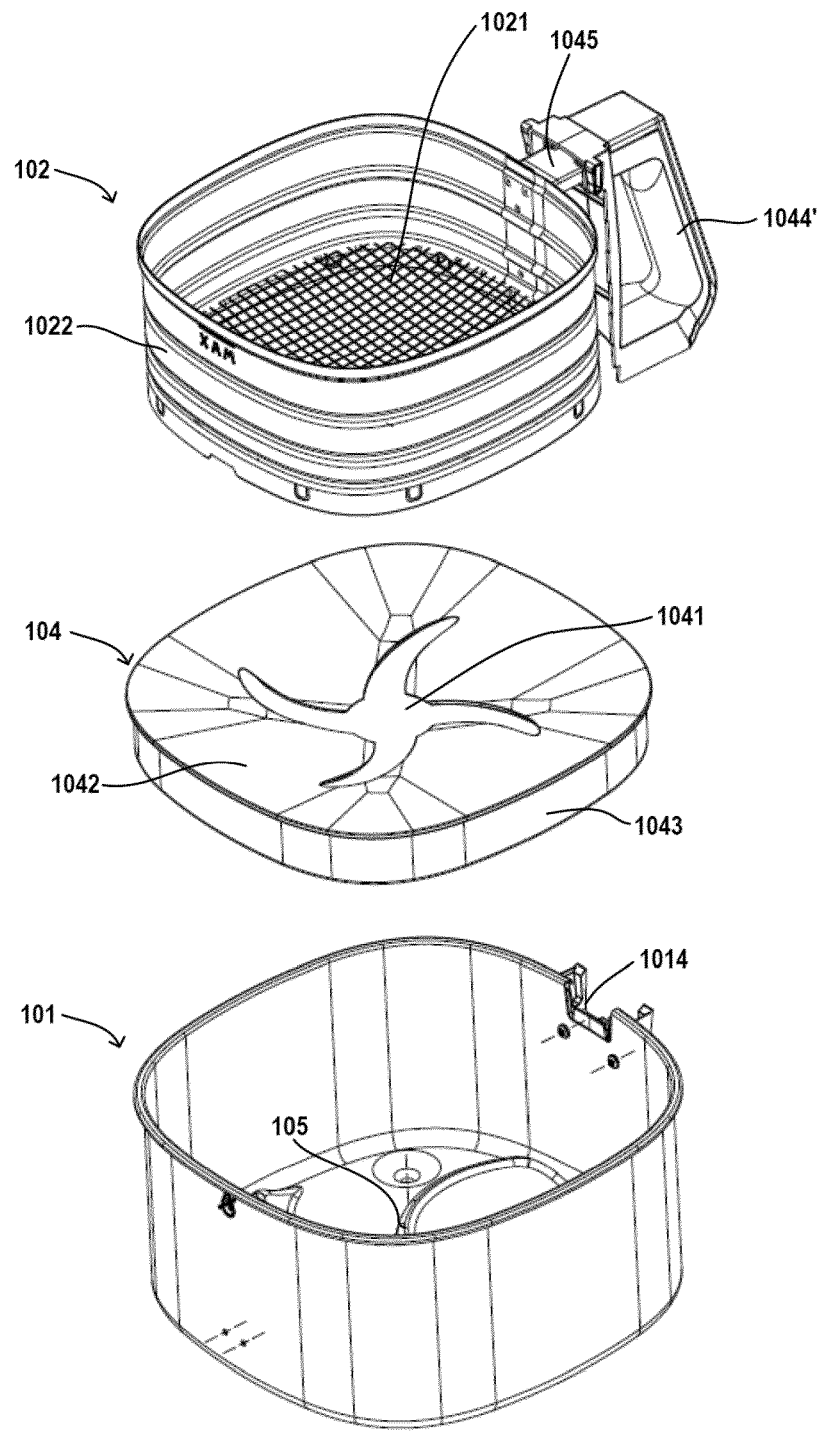
FIG. 5 is an exploded view of the air-frying cooker in FIG. 4.

FIGS. 4-5 illustrate an air-frying cooker according to a second embodiment of the present invention. The air-frying cooker according to the second embodiment is structurally similar to the air-frying cooker according the above first embodiment, and also collects materials falling through the air-permeable bottom 1021 of the food support 102 onto the guide surface 1042, in the second chamber 1012 below the partition 104 based on the principle as illustrated with respect to the air-frying cooker according to the first embodiment, to achieve the effect of maintaining the temperature of the collected materials lower than the smoke point temperature and avoiding fume generation.

The air-frying cooker according to the second embodiment differs from the air-frying cooker according to the previous first embodiment in the following: the food support 102 has an air-impermeable sidewall 1022, and a first space 106 is provided between the sidewall 1022 and an outer wall of the vessel 101; the partition 104 further comprises a supporting wall 1043, and the partition 104 is supported on the bottom wall 1013 of the vessel 101 via the supporting wall 1043, and a second space 107 is provided between the air-permeable bottom 1021 of the food support 102 and the guide surface 1042 of the partition 104. The first space 106 is communicated with the second space 107 to form a portion of an air circulation passageway which is in the first chamber 1011 and passes through the food support 102. During operation of the air-frying cooker, the hot airflow generated by the airflow generating device can enter the first space 106 from the top portion of the food support 102 and reach the second space 107, and then enters again into food support 102 from the air-permeable bottom 1021 of the food support 102, thereby achieving circulation of the hot airflow inside and outside the food support 102. The circulation of the hot airflow can improve an efficiency of the hot airflow heating the food in the food support 102, thereby improving the cooking efficiency of the air-frying cooker.

Advantageously, the guide member 105 may pass through the opening 1041 and partially extend into the first chamber 1011. A portion of the directing surface 1051 located in the first chamber 1011 which extends inclined downwardly from the center towards the periphery may further be used to guide the hot airflow. When the aforesaid circulating hot airflow flows from the second space 107 along the guide surface 1042 inclined towards the bottom wall 1013 of the vessel and contacts with the directing surface 1051 extending into the first chamber 1011, the directing surface 1051 angled to the guide surface 1042 will guide the hot airflow along an extension direction of the directing surface 1051 towards upside of the vessel 101, that is, guiding the hot airflow to pass through the air-permeable bottom 1021 from below the food support 102 into the food support 102. Hence, the guide member 105 further improves the hot airflow circulation efficiency and thereby improves the cooking efficiency of the air-frying cooker. In other words, the guide member 105 may have a double function: it may guide materials that drop down from the food support 2 to a location underneath the partition 104, out of the flow path of the airflow. It may also help to direct or deflect the hot airflow upward so as to flow through the air-permeable bottom 1021 of the food support 102.

As shown in FIG. 4, the guide member 105 may be formed in a spiral shape so that the directing surface 1051 is formed as a spiral surface. The spiral surface facilitates guiding the hot airflow to move spirally into the food support 102, thereby further improving the efficiency of the hot airflow heating the food. It should be appreciated that the opening 1041 preferably is shaped to match with the cross-sectional shape of the guide member 105 so that the gap between the edge of the opening 1041 and the guide member 105 will not be too large and will not weaken the effect of the partition 104 blocking the heat transfer.

In this implementation mode, the food support 102 has a handle 1044' extending to the external of the vessel 101. A bent portion 1045 of the handle 1044' may be rested in a notch 1014 on a sidewall of the vessel 101 (as illustrated in FIG. 5) to support the food support 102 in the vessel 101. While the handle 1044' extending to the external of the vessel provides the positioning and supporting of the food support 102, it also facilitates placing and removing the food support 102 from the external of the vessel 101 by the user. The partition 104 may rest with its supporting structure 1043 on the bottom wall 1013 of the vessel. Alternatively, the partition 104 may be provided with its own handle, similar to the one illustrated in FIG. 2. This handle may for instance be hooked around or otherwise be coupled to the handle 1044' of the food support 102. Alternatively (not show), the partition 104 may be coupled to the food support 102, for instance, to a lower side thereof, preferably via a detachable connection.

FIGS. 6 and 7 show two further embodiments of a partition 204, respectively 304 according to the invention. Each partition 204, 304 comprises a support structure 2043, resp. 3043 for supporting the partion on a bottom wall of a vessel. The support structure 2043 may for instance include a number of legs, as illustrated in FIG. 6 or a wave shaped closed wall 3043, as illustrated in FIG. 7. Each partition 204, resp. 304 comprises a guide surface 2042, resp. 3042 with an opening 2041, resp. 3041, with the guide surface being inclined downward, from its perimeter towards said opening for guiding materials that fall down onto said guide surface towards the opening. The opening may for instance have a circular shape 2014 as illustrated in FIG. 6 or a star shape 3041 as illustrated in FIG. 7. In use, the respective openings may fit around a correspondingly shaped guide member 105. That is, the circular opening 2041 of FIG. 6 may cooperate with a conical guide member (not shown). The starshaped opening 3041 of FIG. 7 may cooperate with a star shaped guide member (not shown). Advantageously, these guide members may have an upper portion of their directing surface 1051 project through the opening 2041 resp. 3041 into the first chamber 1011 of the vessel, to act as air guide arrangement to help directing the air flow upward through the bottom of the food support. As mentioned before, this may improve the efficiency of the airflow circulation and with that the cooking efficiency of the air-frying cooker.

The airflow circulation may further be improved by providing the guide surface 2042, resp. 3042 with a suitable profiling 2045, resp 3045 that may serve as air guide arrangement. The profiling may for instance comprise a number of ribs 2046, 3046. In the illustrated embodiment, four ribs 2046, 3046 are provided. In alternative embodiments, more or less ribs 2046, 3046 may be provided. The ribs 2046, 3046 may extend from the opening 2041, 3041 towards a perimeter of the partition 204, 304. Some or all ribs 2046 may be straight. They may extend in a substantially radial direction, as illustrated in FIG. 6. Some or all ribs 3046 may be curved, so as to spiral towards the perimeter of the partition 304, as illustrated in FIG. 7. Many other shapes are possible. Together, the ribs 2046, 3046 may form an air guide arrangement 2046, resp. 3046 that helps directing the air flow upward, through the air-permeable bottom 1021 of the food support 102. It may be appreciated that in the embodiment of FIG. 7, the ribs 3046 may have a similar shape as the arms of a starshaped guide member that fits through the star shaped opening 3041. Thus, together, the ribs and arms may form two starshaped guide members, one superimposed onto the other, rotated over 45 degrees.

Thus, the ribs 2046, 3046 may cooperate with the guide member 105 to improve the cooking efficiency. Alternatively, the ribs 2046, 3046 may act solely to deflect or direct the airflow upwards, that is, without cooperation of the guide member 105. Such situation may for instance occur where the guide member 105 is designed to have its upper directing surface 1051 lie flush with or lie below the level of the guide surface 2042, 3042 bordering the opening 2041, 3041.

Figure 9:
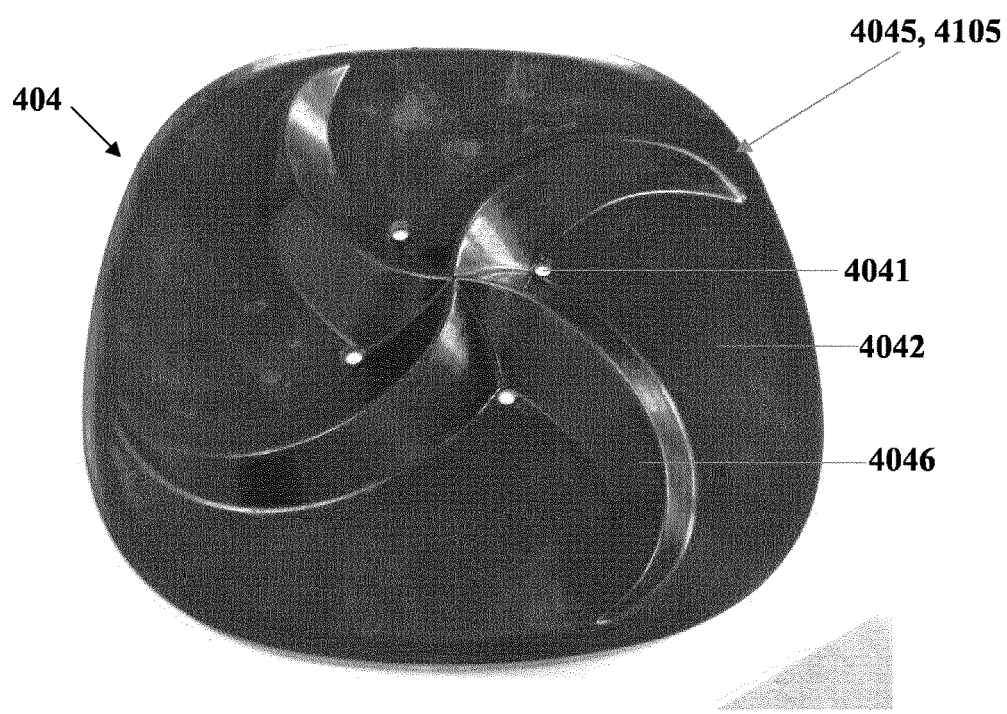

FIGS. 8 and 9 show a further embodiment of a partition 404 according to the invention, with FIG. 8 showing the partition 404 in cross sectional view, in mounted condition, and FIG. 9 showing the partition 404 in perspective top view. In this embodiment, the partition 404 may comprise a supporting structure 4043 similar to one of the afore-described supporting structures, and a guide surface 4042 that may be inclined similar to the afore-described guide surfaces. The guide surface 4042 is provided with an air guide arrangement 4045 comprising four ribs 4046 that meet each other in the centre of the guide surface 4042 and from there extend radially outward, in a curved or spiraled way, towards the perimeter of the partition 404. Openings 4041 are provided, in the armpits defined between two neighbouring ribs 4046, where the inclined guide surface 4042 has its lowest point. Thus, materials that in use may fall down onto the partition 404 will be guided towards said openings 4041 via gravity and will fall through said openings 4041 into the second chamber 1012. In the illustrated embodiment, as best seen in FIG. 8, edge portions of the openings 4041 facing the centre of the partition may be folded downward to serve as guide members 4105, guiding the materials to fall in the second chamber 1012, at a position that is covered by the partition 404. In alternative embodiments, a guide member 105 may be provided on the bottom wall 1013 so as to guide the material away from a position directly underneath the openings 4041.

Alternatively, no guide member 105 may be provided.

Figure 10:
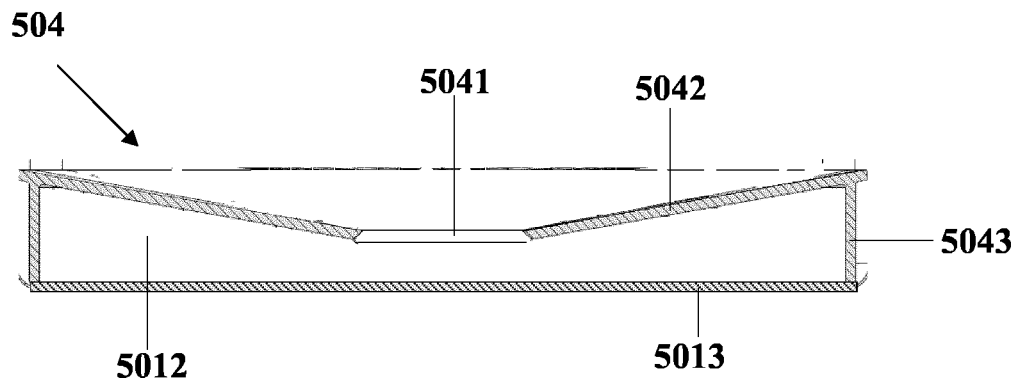

FIG. 10 schematically shows a further embodiment of a partition 504 according to the invention, in cross sectional view. The partition comprises a guide surface 5042 that is slanted downwards towards an opening 5041 in said guide surface. The opening 5041 may for instance have a circular shape like the one shown in FIG. 6 or a star shape like the ones shown in FIGS. 2, 5 and 7, or any other suitable shape. The guide surface 5042 may be provided with a profiling (not shown) that may be similar to one of the profilings described in relation to the other embodiments, to serve as air guide arrangement. The partition 504 further comprises a support structure 5043 that in the given example has a closed bottom 5013. Thus, any materials falling down onto the partition 504 may be guided through the opening 5041 into the second chamber 5012 enclosed by the support structure 5043 and bottom 5013. After use, the partition 504 may be removed from the vessel, with all materials collected therein, thus facilitating cleaning of the air-frying cooker. The bottom 5013 may be slightly convex, dome shaped, or may slant downwards from its center towards its edge or be provided with any other suitable profiling (all not shown) to guide materials that in use fall on the bottom 5013 away from the opening 5041, towards the periphery of the bottom 5013, to a location underneath the guide surface 5042. In this application "a location underneath" the guide surface 5042 means any location that lies within the boundaries of the vertical projection of said guide surface 5042.

Figure 11:
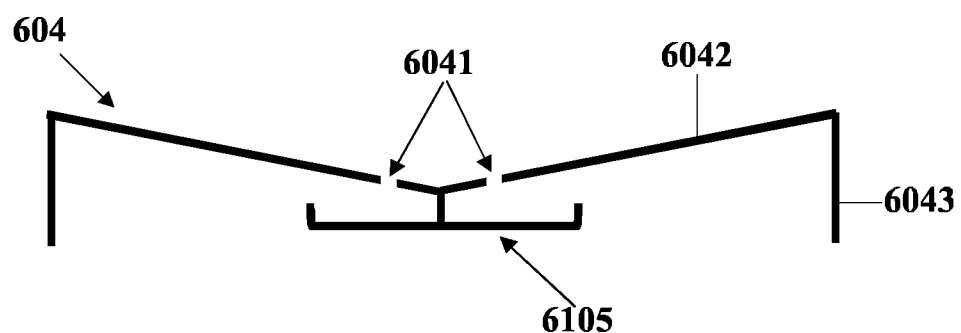

FIG. 11 schematically shows a further embodiment of a partition 604 according to the invention, in cross sectional view. The partition comprises a guide surface 6042 that is slanted downwards towards one or more openings 6041 in said guide surface. The openings 6041 may for instance be arranged in a circle around the centre of the guide surface 6042. Any other suitable configuration is possible. The guiding surface 6042 may be provided with a profiling (not shown) that may be similar to one of the profilings described in relation to the other embodiments. The partition 604 may further comprises a support structure 6043 that may be similar to one of the earlier described embodiments. The partition 604 may further comprise a saucer shaped guide member 6105, as illustrated, with an elevated circumferential edge. The guide member 6105 may be integrally or detachably connected to the partition 604, e.g. to a lower side thereof, as illustrated. Alternatively (not shown), the guide member 6105 could be construed as a separate component, that may for instance be disposed on the bottom wall 1013 of the vessel, below the openings 6041 in the partition 604. The bottom of the guide member 6105 may be slightly convex, domeshaped, inclined downward towards its perimeter, or have any other suitable shape (all not shown) to promote downward movement of the materials collecting thereon towards the edge of the guide member 6105.

During use, any materials falling down onto the partition 604 will be guided through gravity along the slanted guide surface 6042 towards and through the openings 6041 and onto the guide member 6105. After use, the partition 604 may be removed from the vessel together with the guide member 6105 and all materials collected therein. Thus, like the embodiment of FIG. 10, the embodiment of FIG. 11 allows for easy cleaning of the air-frying cooker.

It should be appreciated that the above embodiments illustrate the principle of the present invention, but is not intended to limit the scope of the present invention; and it should be appreciated by those skilled in the art that medications and variations may be adopted without departing from the spirit and scope of the present invention. These modifications and variations are considered in the scope of the present invention and the appended claims. The protection scope of the present invention is defined by the appended claims. In addition, any reference sign in claims should not be construed as limiting the claims. Use of the verb "comprise" and its variants does not exclude existence of elements or steps besides those recited in claims. The indefinite article "a" or "an" preceding an element or step does not exclude existence of a plurality of such elements.

The invention claimed is:

1. An air-frying cooker, comprising:
a vessel;
a food support located in the vessel and having an air-permeable bottom;
a guide member located on a bottom wall of the vessel; and
a partition located in the vessel and located below the food support,
wherein the partition includes a supporting structure that extends from a periphery of a lower portion of the partition onto the bottom wall of the vessel,
wherein the partition divides a space in the vessel into a first chamber accommodating the food support and a second chamber located below the first chamber,
wherein the partition at least partially blocks heat transfer from the first chamber to the second chamber, and guides materials falling from the air-permeable bottom of the food support into the first chamber to the second chamber,
wherein the partition comprises a guide surface having an opening at or near a center,
wherein the shape of the opening matches the cross-sectional shape of the guide member so that the opening is fit around the guide member,
wherein the guide surface, from an edge of the guide surface to the opening, gradually inclines towards a bottom of the vessel to guide the materials falling into the first chamber to move along the guide surface and enter the second chamber through the opening,
wherein the guide member guides the materials, falling from the air-permeable bottom of the food support into the first chamber to the second chamber, to a location underneath the partition, out of a flow path of airflow generated in the first chamber, and
wherein the guide member further guides the materials entering the second chamber from the first chamber towards a direction away from a radial center of the vessel.

2. The air-frying cooker according to claim 1, wherein the guide member is substantially conical, pyramid, spirally-conical, frustoconical, truncated pyramid, or truncated spirally-conical.

3. The air-frying cooker according to claim 1, wherein the guide member is located at least partly in the second chamber on the bottom wall of the vessel.

4. The air-frying cooker according to claim 1, wherein the guide member is aligned, in an axial direction of the vessel, with the opening in the guide surface of the partition, and the guide member has a directing surface gradually extending inclined away from a level near the opening to the bottom wall of the vessel.

5. The air-frying cooker according to claim 4, wherein the food support is directly placed on the partition.

6. The air-frying cooker according to claim 4, wherein an inclination angle of the guide surface relative to the bottom wall of the vessel is equal to or larger than 10 degrees.

7. The air-frying cooker according to claim 4, wherein the guide member at least partly projects beyond the guide surface of the partition.

8. The air-frying cooker according to claim 1, wherein a gap is provided between the guide member and the opening to allow the materials falling into the first chamber to enter the second chamber through the gap.

9. The air-frying cooker according to claim 1, wherein the guide member passes through the opening and partially extends into the first chamber, and a portion of a directing surface located in the first chamber guides air through the air-permeable bottom of the food support into the food support.

10. The air-frying cooker according to claim 1, wherein:
the food support has a handle extending to an exterior of the vessel, and the food support is supported in the vessel via the handle; or
the partition has a handle extending to an exterior of the vessel, and the partition is supported in the vessel via the handle.

11. The air-frying cooker according to claim 1, wherein the food support comprises a grille plate.

12. The air-frying cooker according to claim 1, wherein, during operation of the air-frying cooker, the partition makes a temperature in the second chamber lower than that in the first chamber by about 50 centigrade degrees.

13. The air-frying cooker according to claim 1, comprising an air guide arrangement, designed to guide air towards and through the air-permeable bottom of the food support, wherein the air guide arrangement is located in the first chamber on the partition integrally formed with the partition.

14. The air-frying cooker according to claim 13, wherein the air guide arrangement is of similar geometry as the guide member.

15. The air-frying cooker according to claim 13, wherein the air guide arrangement comprises at least one air guide rib which extends in an essentially radial direction from the opening in the partition.

16. The air-frying cooker according to claim 1, wherein the food support has a side wall, wherein a first space is provided between the side wall and an outer wall of the vessel, wherein a second space is provided between the air-permeable bottom of the food support and the guide surface of the partition, and wherein the first space and the second space form a portion of an air circulation passageway which is in the first chamber and passes through the food support.

17. A partition for use in an air-frying cooker to divide an internal space in the air-frying cooker into a first chamber for accommodating food and a second chamber located below the first chamber, and to at least partially block heat transfer from the first chamber to the second chamber, the partition comprising:

- an inclined guide surface for guiding materials that fall from an air-permeable bottom of a food support into the first chamber to the second chamber through at least one opening at or near a center of the guide surface;
- a supporting structure that extends from a periphery of a lower portion of the partition onto the bottom wall of the vessel for isolating the first chamber and the second chamber;
- the at least one opening at or near the center, located at a lowest point of the guide surface, wherein the guide surface gradually inclines downward, from an edge of the guide surface to the at least one opening, to guide the materials towards and through the at least one opening; and
- a handle extending to an exterior of a vessel, the partition being supported in the vessel via the handle, wherein a guide member, connected to the partition, guides the materials, falling from the air-permeable bottom of the food support into the first chamber to the second chamber, to a location underneath the partition, out of a flow path of airflow generated in the first chamber, wherein the shape of the opening matches the cross-sectional shape of the guide member so that the opening is fit around the guide member, and wherein the guide member further guides the materials entering the second chamber from the first chamber towards a direction away from a radial center of the air-frying cooker.

18. The partition according to claim 17, wherein the guide surface is provided with an air guide arrangement, designed to deflect air that flows along the guide surface upwards, wherein a contour of the air guide arrangement has a shape that is substantially conical, pyramid, spirally-conical, frustoconical, truncated pyramid, or truncated spirally-conical, and wherein the air guide arrangement comprises at least one air guide rib, extending substantially in a radial direction.

* * * * *